Patented July 7, 1931

1,813,346

UNITED STATES PATENT OFFICE

IRA H. DERBY AND ORIN D. CUNNINGHAM, OF INDIANAPOLIS, INDIANA, ASSIGNORS TO PETER C. REILLY, OF INDIANAPOLIS, INDIANA

PROCESS OF ORE FLOTATION AND FLOTATION AGENT

No Drawing.   Application filed December 16, 1930. Serial No. 502,858.

The present invention relates to improvements in ore flotation, including the froth-flotation of sulfide ores, and other metalliferous material, by the use of certain compounds as described herein which structurally consist of phosphorus as a nucleus to which other groups of atoms (radicals) are attached, and which compounds also contain sulfur; these compounds functioning as flotation collecting agents and constituting a class of compounds that has not heretofore been used in the art of flotation.

The present application is in part a continuation of matter from our copending case Serial Number 96,061, filed March 19, 1926.

More particularly, our present invention embraces the concentration of ore material by froth-flotation while using reagents containing products of reaction of phosphorus sulfides (such as the trisulfide, $P_2S_3$, or pentasulfide, $P_2S_5$), with organic nitriles (aromatic or aliphatic) such as, for example, benzonitrile, tolunitrile and phenylacetonitrile, acetonitrile, propionitrile and butyronitrile. These reagents function not only as collecting agents, but also showing some frothing action, when used.

Generally stated it is sufficient to select the desired organic nitrile compound, and to react thereupon with phosphorus pentasulfide or other sulfide of phosphorus, or even with a mixture of yellow phosphorus and sulfur, the reaction being performed in a suitable container, and at a temperature sufficiently high to cause reaction to take place. In some cases it may be found advisable to employ a mixture of compounds, some of which apparently function as solvents, and may also function as both solvents and reacting materials.

For the preparation of the phosphosulfo compounds referred to we give the following specific example:—

One part of powdered phosphorus pentasulfide and about 3–5 parts of benzonitrile are mixed together and heated at 100 to 115° C., or thereabout, with constant stirring, until the reaction is complete as evidenced by the disappearance of solid phosphorus pentasulfide from the reaction mixture. The reaction product is a syrupy liquid.

In a similar manner other organic nitriles, such for example as phenylacetonitrile and tolunitrile or the aliphatic nitriles mentioned, react with phosphorus pentasulfide at about 100 to 115° C., to form liquid products possessing flotation activity.

When using the lower phosphorus sulfide, $P_2S_3$, this same temperature can well be employed, but when using yellow phosphorus and sulfur, it is advisable to heat higher, say to about 180° C., to initiate the conversion of P and S into $P_2S_5$ or $P_2S_3$. These temperatures are subject to considerable variation, and are given by way of illustration only.

In the example given above, pure chemicals were used, but we can also use crude chemicals, with practically as good results, except that it is preferable to use anhydrous materials.

We do not limit our claims to the quantities of reacting substances herein named.

The general procedure indicated in the above example may be applied in chemically combining organic nitriles with phosphorus pentasulfide. In some instances higher temperatures may be employed to hasten the desired chemical combination, and in other cases the reaction may desirably be carried out at lower temperatures. This may depend somewhat on the amount and character of impurities present.

The phosphosulfo compounds above referred to can be used in froth-flotation, either alone or mixed with other materials having flotation value, or with solvent agents or mixtures of the same. Usually we also add pine oil, or cresylic acid or other frothing agent.

The products obtained by the reaction of the organic nitriles with phosphorus pentasulfide, as illustrated in the above example, can be employed in the froth-flotation of a copper sulfide mineral and will be found to possess high flotation activity. The reagents can be used in an alkaline, acid or neutral circuit, depending on the conditions to be met.

In the flotation of ores the amount of the reaction product used can vary between wide limits depending upon the character of the ore, for example .05 lb. of the benzonitrile reaction product can be used with a ton of low grade copper sulfide ore.

In the present case we have described the use of organic nitriles as substances to react with phosphorus sulfides to form a flotation reagent. We have given several examples of such nitriles which are operative for the purpose and we believe that certain closely related nitriles can be used though there are others that will not serve. The expression "organic nitriles" as used in this case is accordingly to be construed as covering the examples given herein and products so closely related thereto as to function in a like manner.

What we claim is:—

1. In the art of froth flotation the step of floating material to be concentrated in the presence of the herein described flotation agent which comprises a reaction product of a phosphorus sulfur compound with an organic nitrile.

2. A process which comprises froth flotation while in the presence of the herein described flotation reagent which is a reaction product of a phosphorus sulfur compound and a substance selected from the herein described group consisting of benzonitrile, tolunitrile and phenylacetonitrile.

3. A process which comprises froth flotation while in the presence of the herein described flotation reagent which is a reaction product of a phosphorus sulfur compound and a substance selected from the herein described group consisting of acetonitrile, propionitrile and butyronitrile.

4. In the art of froth flotation the step of floating material to be concentrated in the presence of the herein described flotation agent which comprises a reaction product of a phosphorus sulfur compound of an aromatic nitrile.

5. In the art of froth flotation the step of floating material to be concentrated in the presence of the herein described flotation agent which comprises a reaction product of a phosphorus sulfur compound with an aliphatic nitrile.

In testimony whereof we have signed our names to this specification.

IRA H. DERBY.
ORIN D. CUNNINGHAM.